(12) United States Patent
VerSteeg

(10) Patent No.: US 11,129,096 B2
(45) Date of Patent: Sep. 21, 2021

(54) SYSTEMS AND METHODS FOR IMPROVED GEOLOCATION IN A LOW POWER WIDE AREA NETWORK

(71) Applicant: Comcast Cable Communications, LLC, Philadelphia, PA (US)

(72) Inventor: William Carroll VerSteeg, Buford, GA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 570 days.

(21) Appl. No.: 15/842,057

(22) Filed: Dec. 14, 2017

(65) Prior Publication Data

US 2018/0176718 A1  Jun. 21, 2018

Related U.S. Application Data

(60) Provisional application No. 62/435,422, filed on Dec. 16, 2016.

(51) Int. Cl.
*H04W 4/02* (2018.01)
*H04W 52/02* (2009.01)
(Continued)

(52) U.S. Cl.
CPC ....... *H04W 52/0209* (2013.01); *G01S 1/0423* (2019.08); *G01S 5/02* (2013.01);
(Continued)

(58) Field of Classification Search
CPC ... H04W 4/02; H04W 52/0225; H04W 64/00; H04W 64/003; H04W 64/006; H04W 68/00
See application file for complete search history.

(56) References Cited

U.S. PATENT DOCUMENTS 7,586,869 B2 * 9/2009 Johnson .................. H04L 12/66
370/328
9,057,774 B2 * 6/2015 Silny ........................ G01S 19/11
(Continued)

FOREIGN PATENT DOCUMENTS

WO   WO 2016 019522 A1   2/2016

OTHER PUBLICATIONS

Extended European Search Report, Application No. 17207451.0-1213; dated Apr. 4, 2018; European Patent Office, (10 pages).

*Primary Examiner* — Jean A Gelin
(74) *Attorney, Agent, or Firm* — BakerHostetler

(57) ABSTRACT

Systems and methods for improved geolocation in a low power wide area network are disclosed. One example method may include receiving an instruction to determine a geolocation of an end in a low power wide area network. An instruction may be transmitted to the end node for the end node to transmit a high-energy geolocation signal at a power of about 0.5 Watt to about 1 Watt. The end node may transmit the high-energy geolocation signal and a plurality of gateways of the low power wide area network may receive the high-energy geolocation signal. A plurality of receipt times may be identified. Each receipt time may be indicative of the time at which the high-energy geolocation signal was received by the respective gateway of the plurality of gateways. Based at least in part on the plurality of receipt times, a geolocation of the end node may be determined.

20 Claims, 5 Drawing Sheets

(51) Int. Cl.
  *G01S 5/02* (2010.01)
  *G01S 1/04* (2006.01)
  *H04W 64/00* (2009.01)
  *G01S 5/06* (2006.01)
  *G01S 5/14* (2006.01)
  *H04W 84/04* (2009.01)

(52) U.S. Cl.
  CPC ............ *G01S 5/0205* (2013.01); *H04W 4/02* (2013.01); *G01S 5/06* (2013.01); *G01S 5/14* (2013.01); *H04W 64/00* (2013.01); *H04W 84/04* (2013.01); *Y02D 30/70* (2020.08)

(56) References Cited

U.S. PATENT DOCUMENTS

| | | | | |
|---|---|---|---|---|
| 9,558,475 | B2* | 1/2017 | Seligmann | G06Q 10/109 |
| 9,609,577 | B1* | 3/2017 | Ramalingam | G06Q 20/10 |
| 9,752,840 | B1* | 9/2017 | Betro | F41A 17/06 |
| 9,820,255 | B1* | 11/2017 | Demsey | H04W 12/10 |
| 2004/0230685 | A1* | 11/2004 | Seligmann | G01C 21/00 |
| | | | | 709/228 |
| 2006/0125695 | A1* | 6/2006 | Kennedy, Jr. | H04B 1/1081 |
| | | | | 342/465 |
| 2006/0270420 | A1* | 11/2006 | Brock | H04W 52/0229 |
| | | | | 455/456.2 |
| 2007/0111746 | A1 | 5/2007 | Anderson | |
| 2012/0026041 | A1 | 2/2012 | Murdock et al. | |
| 2012/0122477 | A1* | 5/2012 | Sadek | H04W 16/14 |
| | | | | 455/456.1 |
| 2013/0104035 | A1* | 4/2013 | Wagner | G06F 16/29 |
| | | | | 715/240 |
| 2013/0178229 | A1* | 7/2013 | Henry | G01S 5/06 |
| | | | | 455/456.1 |
| 2013/0326250 | A1* | 12/2013 | Sullivan | G06F 9/4418 |
| | | | | 713/323 |
| 2014/0344294 | A1* | 11/2014 | Skeen | G06F 16/686 |
| | | | | 707/754 |
| 2015/0011175 | A1* | 1/2015 | Mondal | H04W 4/023 |
| | | | | 455/404.2 |
| 2015/0082459 | A1* | 3/2015 | Kelly | H04W 12/02 |
| | | | | 726/28 |
| 2015/0335291 | A1* | 11/2015 | Saadi | A61B 5/1123 |
| | | | | 702/141 |
| 2016/0095092 | A1 | 3/2016 | Khoryaev | |
| 2016/0321649 | A1* | 11/2016 | Dragushan | G06Q 20/3224 |
| 2016/0328661 | A1* | 11/2016 | Reese | G06N 3/0445 |
| 2016/0358144 | A1* | 12/2016 | Thrope | H04W 4/80 |
| 2017/0013585 | A1* | 1/2017 | Stapleton | H04W 4/90 |
| 2017/0142570 | A1* | 5/2017 | Self | H04W 4/029 |
| 2017/0150475 | A1 | 5/2017 | Li | |
| 2017/0163685 | A1* | 6/2017 | Schwartz | H04L 63/20 |
| 2017/0230074 | A1* | 8/2017 | Rose | H04B 1/1036 |
| 2017/0270563 | A1* | 9/2017 | Soni | H04L 67/02 |
| 2017/0332343 | A1* | 11/2017 | Vaccari | H04W 64/006 |
| 2018/0006719 | A1* | 1/2018 | Cress | H04B 10/071 |
| 2018/0040002 | A1* | 2/2018 | Tierney | G06F 30/0201 |
| 2018/0108974 | A1* | 4/2018 | Williams | G08C 17/02 |
| 2018/0167948 | A1* | 6/2018 | Egner | H04W 76/16 |
| 2018/0176727 | A1* | 6/2018 | Williams | A61B 5/747 |
| 2020/0355781 | A1* | 11/2020 | Smith | G01S 5/0244 |
| 2020/0356900 | A1* | 11/2020 | Briancon | G06N 5/04 |
| 2020/0402099 | A1* | 12/2020 | Pittman | G06Q 30/0269 |

* cited by examiner

SYSTEMS AND METHODS FOR IMPROVED GEOLOCATION IN A LOW POWER WIDE AREA NETWORK

RELATED APPLICATIONS

This application claims the benefit of U.S. Patent Application No. 62/435,422, filed Dec. 16, 2016, which is hereby incorporated by reference in its entirety.

BACKGROUND

In the Internet of Things (IoT) model, a wide variety of objects may be equipped with embedded electronics (e.g., processor, memory, sensor, actuator, network interface, etc.) that enable these objects to collect and exchange data across a communication network. The communication network often includes, at least in part, a wireless communication network. For example, a natural gas meter at a premises may be configured with electronics to collect and store information relating to the quantity of natural gas provided to the premises and to later transmit that data to the gas company's central server. As another example, a heart rate monitor implant may be configured to wirelessly transmit a patient's heart rate to an upstream server for evaluation and monitoring. In many cases, the embedded electronics are unconnected to an external power source and must be powered by battery or other limited power source.

As one measure to conserve power, low power wide area networks (LPWAN) have been implemented. In an LPWAN, the electronics embedded in objects (referred to as "end nodes" or "sensors") transmit and receive data typically only at various intervals determined by the end node, as opposed to continuously being in a mode to transmit and receive data, which consumes power. The end nodes may communicate, via wireless radio transmission, with one or more gateways. The gateway(s) may then relay the data further upstream for use by associated application servers.

It is often useful to ascertain a precise and accurate geographic location of an end node for various purposes. Current geolocation solutions may include the use of a global position system (GPS) receiver incorporated with a device. Such a solution is unsuitable for use with an LPWAN, however, because the end nodes of an LPWAN typically have only a limited supply of power and a GPS receiver would impose too great a power burden.

These and other shortcomings are addressed in the present disclosure.

SUMMARY

Systems and methods are disclosed for improved geolocation in a low power wide area network (LPWAN). Methods may include receiving an instruction to determine a geolocation of an end in a low power wide area network. An instruction may be transmitted to the end node for the end node to transmit a high-energy geolocation signal at a power of about 0.5 Watt to about 1 Watt. The end node may transmit the high-energy geolocation signal and a plurality of gateways of the low power wide area network may receive the high-energy geolocation signal. A plurality of receipt times may be identified. Each receipt time may be indicative of the time at which the high-energy geolocation signal was received by the respective gateway of the plurality of gateways. Based at least in part on the plurality of receipt times, a geolocation of the end node may be determined.

An instruction to determine a geolocation of an end in a low power wide area network may be received. One of more parameters of a geolocation signal to be transmitted by the end may further be determined. The one or more parameters of the geolocation signal may be transmitted to the end node. The end node may transmit the geolocation signal to a plurality of gateways of the lower power wide area network according to the one or more parameters. The gateways of the plurality of gateways may receive the geolocation signal. A plurality of receipt times may be identified. Each receipt time may be indicative of the time at which the high-energy geolocation signal was received by the respective gateway of the plurality of gateways. Based at least in part on the plurality of receipt times, a geolocation of the end node may be determined.

A set of processable instructions may be transmitted to an end node of a low power wide area network. The set of instructions may be usable to determine a channel on which a geolocation signal is to be transmitted by the end node. An instruction to determine a geolocation of the end node may be received. The end node may execute the set of instructions to determine the channel on which to transmit the geolocation signal. The end node may transmit the geolocation signal on the determined channel to a plurality of gateways of the low power wide area network. The specific channel used by the plurality of gateways, and thus the end node, may be dynamic. By using a dynamic channel set, the end node is able to transmit at the maximum allowable power within FCC rules. The gateways of the plurality of gateways may receive the geolocation signal on the channel. The gateways of the plurality of gateways may receive the geolocation signal. A plurality of receipt times may be identified. Each receipt time may be indicative of the time at which the high-energy geolocation signal was received by the respective gateway of the plurality of gateways. Based at least in part on the plurality of receipt times, a geolocation of the end node may be determined.

BRIEF DESCRIPTION OF DRAWINGS

The accompanying drawings, which are incorporated in and constitute a part of this specification, illustrate embodiments and together with the description, serve to explain the principles of the methods and systems.

DETAILED DESCRIPTION

The systems and methods of the present disclosure relate to improved geolocation in a low power wide area network (LPWAN). In a low power wide area network one or more end nodes may sense or collect data which may be communicated to one or more application servers for use of that data. The collected data from the end nodes may be communicated to the application servers via one or more gateways that are in wireless radio communication with the end node. In many instances, it is useful to ascertain a precise geolocation of the end nodes.

The precise geolocation of an end node may be determined by transmitting a geolocation signal from the end node to a plurality of gateways. One or more parameters of the geolocation signal, such as transmission power, timing, or waveform of the signal, may be implemented so that geolocation signal is easily recognizable by the gateways. For example, while the standard communications between the end node and the gateways is typically effectuated with a low power spread spectrum signal, the geolocation signal may comprise a relatively high power narrowband signal that is easily distinguished from the standard communications as well as other noise and interference in the operating environment. By virtue of the geospatial signal being easily identified by the gateways, the time at which the geospatial signal is received by the gateways may be more accurately and precisely identified. The times at which the geospatial signal is received by the end nodes may be used in various geolocation techniques, such as trilateration or multilateration, to determine the geolocation of the end node.

Figure 1A:
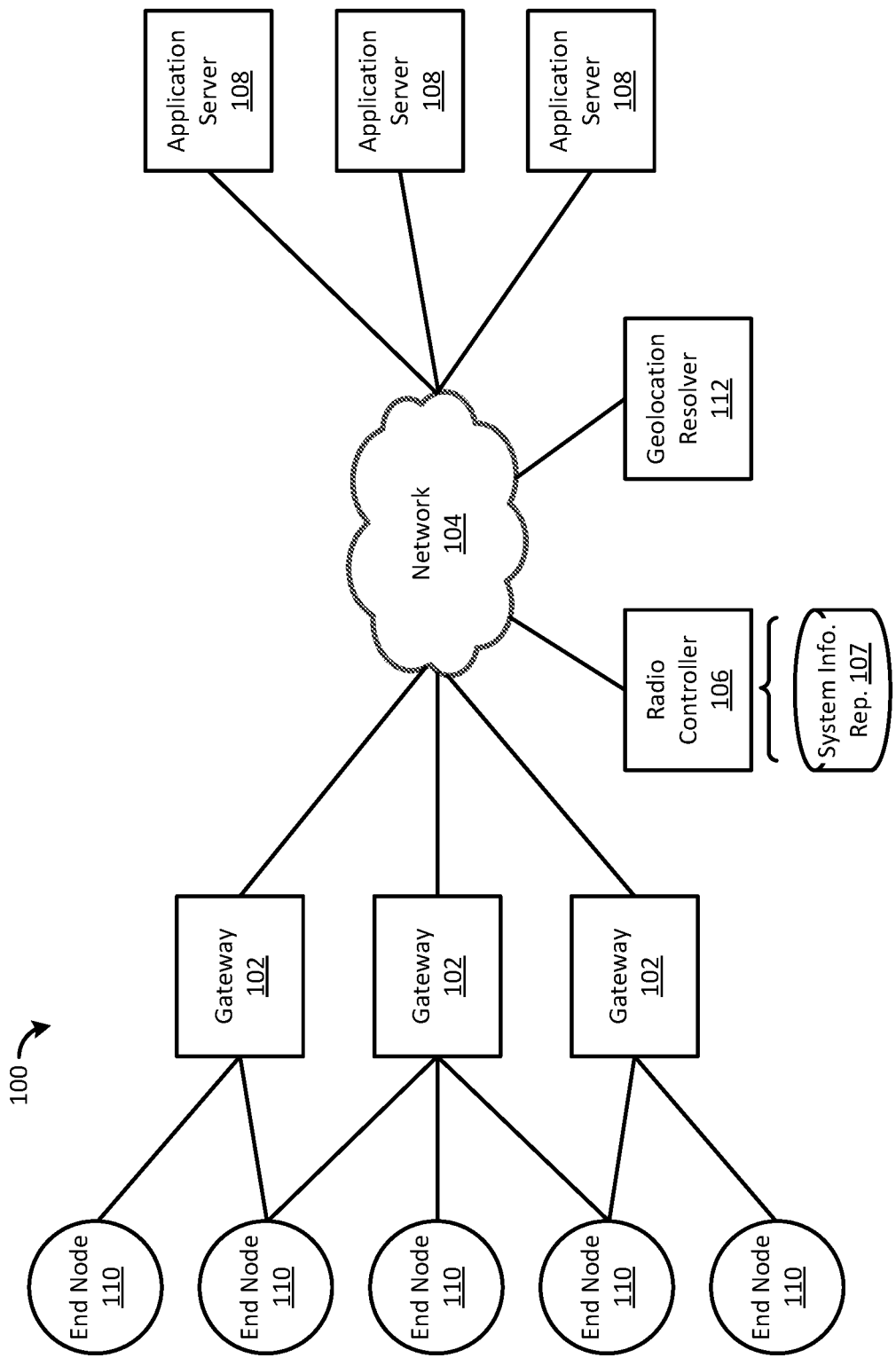
FIG. 1A illustrates a block diagram of an example system according to an embodiment of the present disclosure.

FIG. 1A illustrates various aspects of an exemplary system 100 in which the present methods and systems may operate. One skilled in the art will appreciate that provided herein is a functional description and that the respective functions may be performed by software, hardware, or a combination of software and hardware. The system 100 generally describes a low power wide area network (LP-WAN) in which one or more end nodes 110 communicate with one or more application servers 108 via a radio controller 106 and one or more gateways 102.

The end nodes 110 collect and exchange data according to various functions. For example, an end node 110 may be located in a field of crops to monitor and report the amount of rainfall occurring in the field over a period of time. As another example, an end node 110 may be embedded in a street-corner garbage receptacle to monitor and report the level of garbage in the receptacle. As yet another example, an end node 110 may be incorporated into a tracking collar attached to a wild animal for purposes of tracking the animal or monitoring some biological aspect of the animal, such as its temperature or heart rate. Uses of an end node 110 are not limited to collecting and transmitting data, but may also include performing some useful operation or action. For example, an end node 110 may be incorporated in a lighting device and, upon receipt of a command, may turn the lighting device on or off. As is clear from the above examples, the end nodes 110 may be used in a wide variety of contexts, including building and home automation, transportation, agriculture, retail, industry, supply chain management, manufacturing, healthcare, public utilities, and scientific research.

To facilitate such functions, the end nodes 110 may each be embodied as a computing device. As such, the end nodes 110 may each comprise a processor and a memory. The memory may store instructions that, when executed by the processor, effectuate various operations described herein. The memory may additionally store data collected by the end nodes 110 which is later transmitted to other components of the system 100. The end nodes 110 may each further include a sensor to gather any of various forms of data depending upon the particular application of the end node 110. As some examples according to the above-described exemplary functions of the end nodes 110, the sensor may comprise a rain or moisture sensor, a level sensor, or a biometric sensor. The end nodes 110 may additionally include an actuator to implement some action, such as turning on the aforementioned lighting device.

The end nodes 110 may each further be configured with a communication interface, such as a radio transceiver, to transmit and receive data. For example, the communication interface may be configured to wirelessly communicate with the gateways 102 via radio signals. The communication interface may be configured to communicate using a low power signal (e.g., about 0.1 Watt or in the range of greater than 0 Watt up to and including about. 1 Watt) at some times and using a high power signal at other times. In an aspect, a high power signal may comprise a signal transmitted at about 1 Watt or greater than or equal to about 1 Watt. In another aspect, a high power signal may comprise a signal transmitted at about 0.5 Watt or greater than or equal to about 0.5 Watt. In yet another aspect, a high power signal may comprise a signal transmitted at an inclusive range of about 0.5 Watt to about 1 Watt. In another aspect, a high power signal may comprise a signal transmitted at an inclusive range of about 1 Watt to about 10 Watts. A low power signal may be used for standard communications with the gateways 102. However, a high power signal may be used so that the transmission from the end node 110 is more easily identified by the receiving gateways 102, such as for purposes of precise identification of the time of reception by the particular gateway 102. The precise identification of the time of reception may, in turn, be used to identify the geolocation of the end node 110, as will be discussed in greater detail herein.

Further, a power source, such as a battery or a solar cell, may provide power to the end node 110. It will be appreciated that the end nodes 110 may be integrated with or incorporated into another device or object and, as such, may share some or all components with that device or object.

As indicated, the system 100 may include a radio controller 106. The radio controller 106 may be embodied as one or more interconnected computing devices, such as servers and/or networking devices. As will be discussed further herein, the radio controller 106 may serve to facilitate and coordinate communication between the end nodes 110 and the application servers 108. For example, the interaction between the gateways 102 and the end nodes 110 may be coordinated by the radio controller 106. As such, the radio controller 106 may provide intelligence relating to data packets transmitted between the end nodes 110 and the gateways 102, including, as some examples, scheduling acknowledgments, performing security and data integrity functions, and managing data transmission rates between the end nodes 110 and gateways 102.

The radio controller 106 may comprise a system information repository 107. The system information repository 107 may store information about the various components of the system 100 which may be used in determining the geolocation of one or more end nodes 110. For example, the system information repository 107 may include the known locations of each of the gateways 102. In an aspect, the locations of the gateways 102 may be arranged in a grid representation in which the relevant area of the system 100, or portion thereof, is divided into a grid and each the location of each of the gateways 102 is associated with the respective grid cell.

Further, the system information repository 107 may include an estimated or last-known location of one or more of the end nodes 110. Additional information about the end nodes 110 and/or gateways 102 may additionally be stored in the system information repository 107, such as identifiers or addresses (e.g., MAC addresses) of the end nodes 110 and/or gateways 102 and the technical capabilities of the end nodes 110 and/or gateways 102 (e.g., the number of channels on which the gateways 102 are configured to receive radio transmissions). The system information repository 107 may store information describing the environment in which the end nodes 110 and gateways 102 are situated. For example, information describing objects (e.g., buildings, hills, mountains, or other geographical feature) that may obstruct a direct radio signal path between one or more of the end nodes 110 and one or more of the gateways 102.

The system 100 may further include one or more application servers 108. The application servers 108 may each be embodied as one or more interconnected computing devices, such as servers or networking devices. The application servers 108 may interact with the end nodes 110 (via the radio controller 106 and the gateways 102) and perform a function relating to that interaction with the end nodes 110. As will be appreciated due to the wide variety of potential types and functions of the end nodes 110, the operations performed by the application servers 108 are equally broad. As one example, the application servers 108 may receive data collected by the end nodes 110, process that data, and transmit or present the processed date in some form. For example, if the end node 110 is configured to record a home gas meter's reading, the application servers 108 may receive and process those readings and then email an electronic billing statement to the home's resident. In some aspects, the application servers 108 may function as an interface to receive input from a user. For example, if an estimated or previously calculated geolocation of one or more of the end nodes 110 is deemed to be insufficiently precise or unreliable, the user may input such an indication via one of the application servers 108. The application server 108 may then communication the indication to the geolocation resolver 112 and/or the radio controller 106 so that a more precise and reliable geolocation may be ascertained, as described herein.

The system 100 may further include one or more gateways 102 that, as will be explained in detail herein, facilitate communication between the end nodes 110 and upstream components, such as the radio controller 106 and application servers 108. The gateways 102 may each be embodied as computing devices. Accordingly, the gateway 102 may each be configured with a processor and memory. The memory may store instructions that, when executed by the processor, effectuate various operations described herein. The memory may additionally store data received from the end nodes 110 and/or the radio controller 106. The gateways 102 may each further include one or more communication interfaces, such as a radio transceiver to communication wirelessly via radio signals with one or more end nodes 110 and/or the radio controller 106. The communication interface may additionally comprise an interface for communicating over a wired network, such as an Ethernet or fiber-optic interface. Such an interface may be used to communicate with the radio controller 106, for example.

The system 100 may further include a geolocation resolver 112, which may be embodied as one or more interconnected computing devices, such as servers and/or networking devices. The geolocation resolver 112 may facilitate the determination of the geolocation of one or more end nodes 110 according to one or more techniques described herein. For example, the time of flight of a geolocation signal from one of the end nodes 110 to a plurality of gateways 102 may be measured by calculating the difference in time between when the end node 110 transmitted the geolocation signal and when each of the gateways 102 received the geolocation signal. The times of flight and/or the transmission and receipt times may be communicated to the geolocation resolver 112. With the locations of the gateways 102 being known, as well as the speed of the radio signal between the end node 110 and the gateways 102, the geolocation resolver 112 may use the times of flight in a trilateration process to determine the geolocation of the end node 110. In another aspect, the times at which the gateways 102 received the data packet may be used in a multilateration process to determine the geolocation of the end node 110.

Trilateration may comprise the use of a beacon (e.g., geolocation signal or other data packet) that includes a time code (e.g., clock measurement). As such, recipient devices (e.g., one or more of the gateways 102) of the beacon may rely on the time code to determine transit time of the beacon from transmission time to receipt time. As is understood, geometries (e.g., spheres) may be applied to each recipient device to result in overlap of the applied geometries. Such overlap or intersection may be used to determine a location of a source of the beacon (e.g., the end node 110). The term trilateration may refer to the use of information at multiple recipient devices including two, three, or more.

Multilateration may comprise the use of a beacon (e.g., geolocation signal or other data packet) that does not include a time code (e.g., clock measurement). As such, recipient devices of the beacon may not be able to rely on a transmission time to determine transit time of the beacon. Alternatively, various recipient devices (e.g., one or more of the gateways 102) may share a common clock with each other. In certain aspects, the source of the beacon (e.g., the end node 110) may not share a common clock with recipient devices. However, any two recipient devices may determine a time delta of arrival of the beacon with respect to another recipient device. As such, a paraboloid may be applied to the recipient devices and may include the source of the beacon. The intersection of two paraboloids is a curve. The intersection of three paraboloids is two points. The intersection of four paraboloids is a point (e.g., with an error determination). Such overlap or intersection may be used to determine a location of a source of the beacon.

It will be appreciated that, in some aspects, the components of the system 100 may be combined as single components. For example, in one aspect, the radio controller 106 and the geolocation resolver 112 may be embodied as a single component. In another aspect, the geolocation resolver 112 and one or more of the application servers 108 may be embodied as a single component.

The components of the system 100 (e.g., the gateways 102, the radio controller 106, the geolocation resolver 112, and/or the application servers 108) may communicate with one another via a network 104. The network 104 may be configured as a local area network (LAN), a wide area network (WAN), the Internet, and/or the like. Further, the network 104 may comprise a wireless and/or a wired network. As an example of a wireless network, the network 104 may include a cellular network, such as a 3G (third generation) or LTE (Long Term Evolution) cellular network. As other examples, the network 104 may include a satellite network or a Wi-Fi network. As examples of a wired network, the network 104 may include an Ethernet network, a coaxial cable network, or a fiber optic network.

As already noted, the gateways 102 may facilitate communication between one or more of the end nodes 110 and the radio controller 106. The end nodes 110 and the gateways 102 may communicate using one or more radio modulations techniques. For example, in one aspect, the end nodes 110 and gateways 102 may communicate using frequency-shift keying (FSK) modulation. In another aspect, the end nodes 110 and the gateways 102 may communicate using a spread spectrum modulation technique, such as chirp spread spectrum modulation. Further, an adaptive data rate (ADR) scheme may be employed in the communication between the end nodes 110 and the gateways 102. For example, the data rate used in a particular communication between one of the end nodes 110 and one of the gateways 102 may be a function of the duration of the communication required and the signal strength between the end node 110 and the gateway 102.

The gateways 102 may facilitate communication between the end nodes 110 and the application servers 108 as follows. An end node 110 may initiate an uplink communication with one or more gateways 102. The uplink communication may be event driven, such as if the end node 110 sensed a particular event or received a particular input, or may be performed according to a schedule determined by the end node 110. The schedule may include a random component. For example, the schedule may indicate that the uplink communication is to be sent at a pre-determined time plus a small randomly-determined time offset. To initiate uplink communication with one or more gateways 102, the end node 110 may send an uplink message packet to one or more gateways 102. The uplink message packet may include a payload, which may comprise the data intended to be transmitted to one or more application servers 108. The uplink message packet may further comprise a preamble, which may include metadata describing various aspects of the uplink message packet and/or the payload. Yet further, the uplink message packet may include a time measurement at which the end node 110 transits the uplink message packet to the gateways 102. For example, the time measurement may be a common clock time.

After the end node 110 transmits the uplink message packet, the end node 110 may open one or more successive receive windows during which a downlink message packet may be received by the end node 110. For example, a first receive window may be a one second time interval from the time that the uplink message packet was transmitted and a second receive window may be a two second time interval starting from the end of the first receive window.

The one or more gateways 102 may receive the uplink message packet. The time measurements at which each of the one or more gateways receives the uplink message packet may be identified. This time measurement may be appended onto the uplink message packet or may be stored separately. The one or more gateways 102 may then relay the uplink message packet, along with the time measurement indicating when the respective gateway 102 received the uplink message packet, to the radio controller 106. The radio controller 106 may receive the uplink message packets and perform various operations to coordinate and process the uplink message packets. For example, the radio controller 106 may determine if redundant uplink message packets were received (since more than one gateway 102 may receive and relay the uplink message packet). As another example, the radio controller 106 may verify the integrity and security of the payload, such as via a CRC (cyclic redundancy check) code included in the uplink message packet. In addition, the radio controller 106 may schedule an acknowledgement to be sent back to the end node 110. As such, the radio controller 106 may select one of the gateways 102 that relayed the uplink message packet to relay a downlink message packet to the end node 110 in response to the uplink message packet. Thus, while the uplink message packet may be relayed by multiple gateways 102, the downlink message packet in response may instead be relayed to the end node 110 by only a single gateway 102.

Similar to the uplink message packet, the downlink message packet may include a preamble and a payload. The payload may contain data intended to be delivered to the end node 110. The preamble may describe various aspects of the downlink message packet and/or the payload. The downlink message packet may further include an acknowledgement to a previously received uplink message packet. It will be noted that the downlink message packet may include an acknowledgement without a payload. That is, the downlink message packet may serve as an acknowledgement to an uplink message packet without including any substantive data.

With the uplink message packet having been received by the radio controller 106, the radio controller 106 may transmit the uplink message packet and/or the data contained in the payload of the uplink message packet to one or more application servers 108. The application servers 108 may use the data for various purposes according to the particular function being implemented. The radio controller 106 may further receive the time measurement indicating when the end node 110 transmitted the uplink message packets to the gateways 102 and the time measurements indicating when the gateways 102 received the uplink message packets from the end node 110. One or both of these time measurements may be incorporated with the uplink message packet or transmitted separately. The radio controller 106 may transmit the time measurements to the geolocation resolver 112 for use in calculating the geolocation of the end node 110.

If appropriate for the particular function implemented by the end nodes 110 and application servers 108 (e.g., the function requires bi-directional communication between the end nodes 110 and the application servers 108), the application servers 108 may transmit data to the radio controller 106 for ultimate delivery to one or more of the end nodes 110. The data may be in the form of a downlink message packet or other form. The radio controller 106 may receive the data and, if necessary, format it as a downlink message packet including the data as a payload. The radio controller 106 may hold the downlink message packet until an uplink message packet is received from the destination end node 110, which indicates that the end node 110 has opened one or more receive windows. Responsive to receiving the uplink message packet, the radio controller 106 may select one of the gateways 102 and transmit the downlink message packet to the selected gateway 102 with instructions for the gateway 102 to further transmit the downlink message packet to the destination end node 110. The gateway 102 may receive the downlink message packet and transmit it to the end node 110, preferably within one of the end node's 110 receive windows.

Figure 1B:
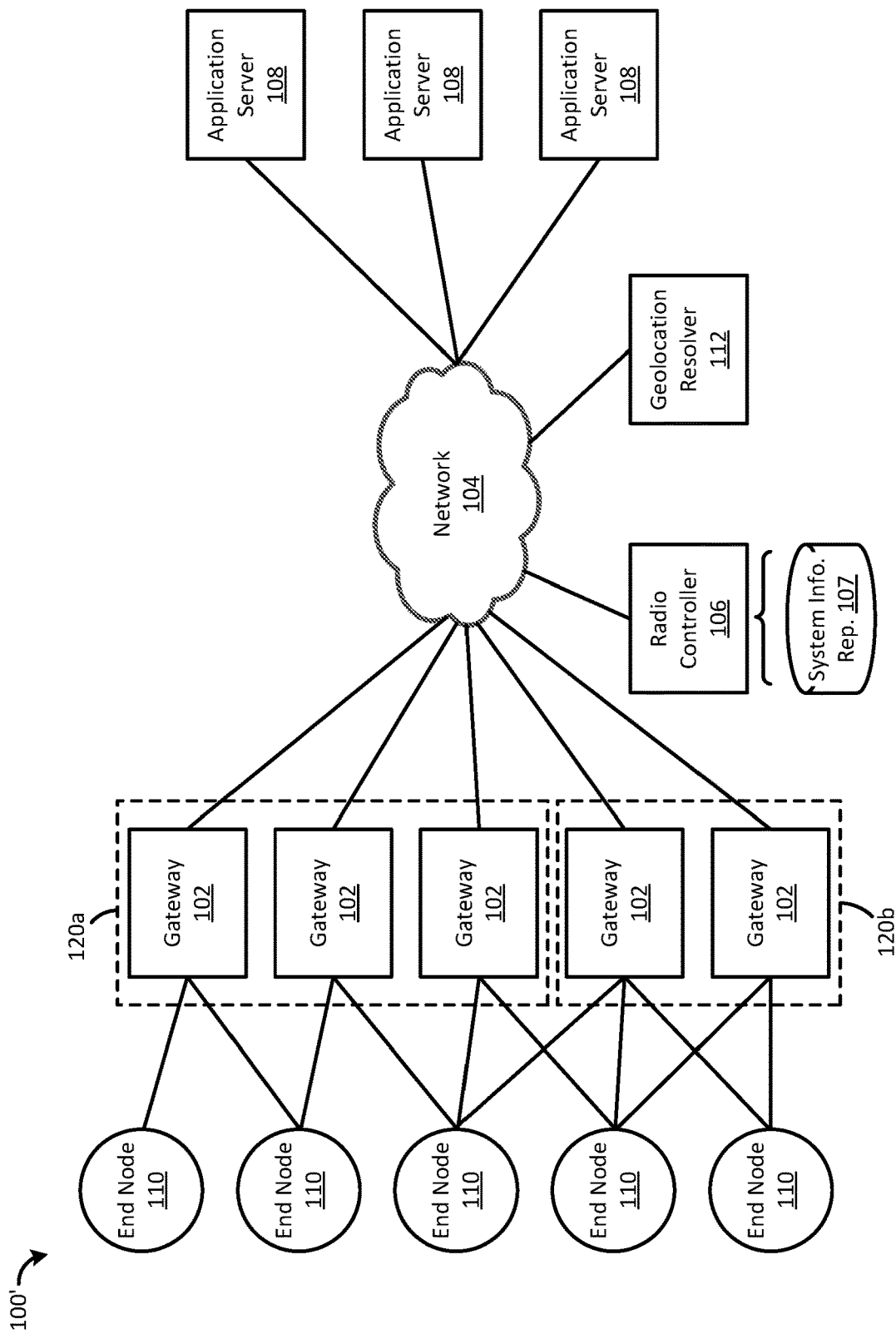
FIG. 1B illustrates a block diagram of an example system according to an embodiment of the present disclosure.

FIG. 1B illustrates another exemplary system 100' in which the present methods and systems may operate. The system 100' may be similar to the system 100 shown in FIG. 1A except as otherwise indicated. Accordingly, like reference numbers refer to like elements.

In the system 100', all or some of the gateways 102 may be categorized into one or more gateway-channel clusters 120a, b. Each of the gateways 102 in a gateway-channel cluster 120a, b may operate such that, at any given time, each of the gateways 102 in that cluster are tuned to the same channel. For example, each of the gateways 102 in one of the gateway-channel clusters 120a, b may execute a set of instructions or algorithm that selects a channel on which to operate out of a pre-determined set of channels. Each of the gateway-channel clusters 120a, b may be associated with and/or utilize a different particular set of instructions or algorithm so that the respective gateways 102 of the gateway-channel cluster 120a and the gateway-channel cluster 120b typically operate on different channels at a given time. The pre-determined set of channels from which the set of instructions or algorithm selects the operating channel may partially coincide, fully coincide, or be mutually exclusive between the gateway-channel clusters 120a, b. The set of instructions or algorithm may be executed by each gateway 102 in one of the gateway-channel clusters 102a, b at set time intervals to determine a new channel from the set of channels on which to operate. Thus, over a successive number of time intervals, each of the gateways 102 of the gateway-channel cluster 120a, b may cycle through and operate over an equal number of channels in synchronization. To illustrate, during a first time interval, each of the gateways 102 of the gateway-channel cluster 120a may operate on a first channel and each of the gateways 102 of the gateway-channel cluster 120b may operation on a second channel. During a subsequent second time interval, each of the gateways 102 of the gateway-channel cluster 120a may operate on a third channel and each of the gateways 102 of the gateway-channel cluster 120b may operate on a fourth channel, and so forth.

The set of instructions or algorithm by which the gateways 102 of a gateway-channel cluster 120a, b determine the channel on which they all operate at a given time may be shared with one or more other components of the system 100', such as one or more of the end nodes 110. As will be discussed in greater detail herein, the end nodes 110 may leverage the set of instructions or algorithm to determine a channel on which to transmit a geolocation signal for use in calculating the geolocation of the end nodes 110.

Figure 2:
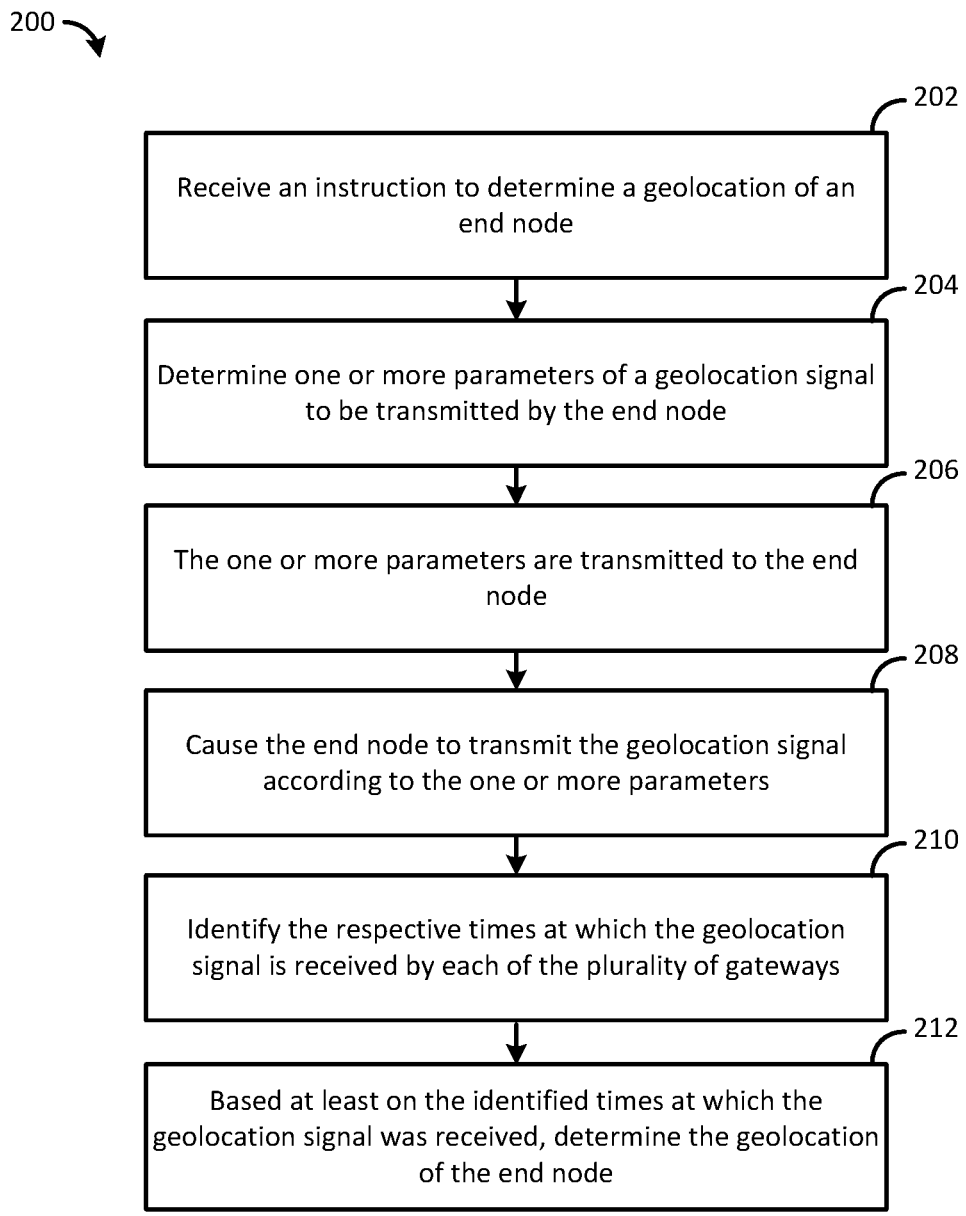
FIG. 2 illustrates a flow chart of an example method according to an embodiment of the present disclosure.

FIG. 2 illustrates an example method 200 by which a more precise geolocation of the end node 110 may be determined using a geolocation signal with one or more parameters selected for such a purpose. At step 202, an instruction or other indication may be received or accessed to determine a geolocation of one of the end nodes 110. The instruction may be received, for example, by the radio controller 106. The instruction may be responsive to a prior determination that a geolocation of the end node 110 that is already known is insufficiently precise or inaccurate. Such a determination may be a result of the application of various business rules or may be precipitated by a user input. For example, a user may indicate via a user interface provided by one or more of the application servers 108 that the geolocation of the end node 110 should be determined more precisely.

At step 204, one or more parameters of a geolocation signal that is intended to be transmitted by the end node 110 to one or more gateways 102 are determined. The one or more parameters of the geolocation signal may generally be directed to configuring the geolocation signal to more easily be received and identified by the gateways 102 and, as such, allow for a more accurate identification of the time at which the geolocation signal is received. The one or more parameters of the geolocation signal may be determined by the radio controller 106, for example.

A parameter of the geolocation signal may include the power level of the geolocation signal, the waveform shape or other attribute of the geolocation signal, and/or the timing that the geolocation signal is sent by the end node 110. As one example, the geolocation signal may be sent at a high power level (e.g., about 1 Watt or other power level described herein as a high power signal), which would be unsuitable for typical communication from the end node 110 due to the resultant increased power consumption. It is recalled that the end nodes 110 may not have an external power source and must rely on a limited internal power source, such as a battery or solar cell.

The one of more parameters of the geolocation signal may be determined based, at least in part, on one or more factors or attributes relating to the system 100, the components thereof, and/or the environment in which the system 100 operates. Such information may be retrieved, for example, from the system information repository 107 associated with the radio controller 106. As some examples, the one or more parameters of the geolocation signal may be determined based on the noise characteristics of the channel upon which the geolocation signal is transmitted, the distance(s) between the end node 110 and the gateways 102, and/or the existence of any obstructions (e.g., a building) in the path between the end node 110 and the gateways 102. The one or more parameters of the geolocation signal may further be governed by the rules of the Federal Communications Commission (FCC). For example, FCC rules may limit the limit the power at which a signal is transmitted unless spread across a minimum number of channels.

As one example of determining the one or more parameters of the geolocation signal, if the end node 110 is known (or estimated) to be within a certain proximity to a sufficient number of gateways 102 to perform a geolocation determination and there are no obstructions between the end node 110 and those gateways 102, the geolocation signal may be sent with a lower power level (e.g., about 0.1 Watt or other power level described herein as a low power signal). Conversely, if the known (or estimated) distance between the end node 110 and the gateways 102 is greater than a certain threshold (i.e., the end node 110 is far away from the gateways 102), the geolocation signal may be transmitted at a high power (e.g., about 1 Watt or other power level described herein as a high power signal).

As another example, if one or more of the gateways 102 anticipated to receive the geolocation signal are suspected to be receiving a primary signal (i.e., a direct, non-reflected signal) and a multipath signal (i.e., a signal that has reflected off of at least one object) from the end node 110, the geolocation signal could be constructed to have a periodic waveform that allows the distance between the end node 110 and the reflecting object and the distance between the reflecting object and the gateway 102 to be determined. For example, the geolocation signal may have maxima and minima spaced in order to create constructive (or destructive) interference in the presence of specific multipath.

As another example, the one or more parameters of the geolocation signal may dictate that the geolocation signal have a waveform with several maxima and/or minima. This may allow the receiving gateway 102 several opportunities to find and receive the geolocation signal. For example, the channel(s) on which the geolocation signal is transmitted may have a fluctuating noise profile. By transmitting the geolocation signal with a waveform having several maxima and/or minima, the gateway 102 may find and receive the geolocation signal while the noise is at a minimum and the geolocation signal is at a maximum.

As yet another example, the environment in which the system 100 operates may suffer from a periodic interferer that may interfere with and obfuscate the geolocation signal at particular times. Accordingly, the geolocation signal may be transmitted from the end node 110 to the gateways 102 at a time other than that which the period interferer is transmitting. Additionally or alternatively, the environment of the system 100 may include an interferer that is causing interference on a particular sub-carrier, channel, or frequency. To avoid this interference, the geolocation signal may be transmitted by the end node 110 on a different sub-carrier, channel, and/or frequency.

As a further example, one or more channels in the environment of the system 100 may be reserved for narrowband signaling, which may keep those channels more clean of wideband interference. Accordingly, the geolocation signal (which may be a narrowband signal) may be transmitted by the end node 110 on those one or more channels reserved for narrowband signaling.

At step 206, the one or more parameters of the geolocation signal may be transmitted to the end node 110. The radio controller 106 may transmit the geolocation signal to the end node 110 via one or more gateways 102. For example, the radio controller 106 may select one of the gateways 102 based, at least in part, on which gateway 102 is best suited to handle the downstream communication to the end node 110. The radio controller 106 may accordingly transmit the one or more parameters of the geolocation signal to the selected gateway 102. The gateway 102 may receive the one or more parameters and store them until its next communication with the end node 110.

The end node 110 may transmit an uplink message packet to one or more gateways 102 within communication range of the end node 110. The uplink message packet may include a payload with data, such as data collected by the end node 110 and intended to be delivered to the application servers 108. The uplink message packet may be transmitted by the end node 110 according to a schedule maintained by the end node 110 or according to an event detected by the end node 110, as some examples. The gateways 102, which may include the gateway 102 selected by the radio controller 106 to provide the geolocation signal parameter(s), may thereby receive the uplink message packet. Responsive to receiving the uplink message packet, the gateway 102 may initiate a reply communication with the one or more parameters of the geolocation signal to the end node 110. For example, the gateway 102 may transmit the one or more parameters of the geolocation signal to the end node 110 as part of a downlink message packet.

The downlink message packet may further include instructions for the end node 110 to transmit the geolocation signal at its next transmit opportunity (or at a specified time, if so indicated by the geolocation signal parameter(s)). In some aspects, the next transmit opportunity may be responsive to the end node 110 receiving the downlink message packet from the gateway 102. In other aspects, the next transmit opportunity may occur at a later time, such as responsive to the end node 110 detecting an event that triggers a communication with the gateway 102 or according to a communication schedule maintained by the end node 110.

The downlink message packet may yet further include an acknowledgement that the gateway 102 received the uplink message packet from the end node 110. The downlink message packet with the geolocation signal parameter(s) may be transmitted to the end node 110 during a receive window opened by the end node 110 during which the end node 110 is operable to receive communications.

At step 208, responsive to the end node 110 receiving the parameter(s) of the geolocation signal, the end node 110 may be caused to transmit the geolocation signal to a plurality of gateways 102 according to the parameter(s) of the geolocation signal. Accordingly, the plurality of gateways 102 may receive the geolocation signal. For example, the plurality of gateways 102 may comprise the gateways 102 that are within communication range of the radio transceiver of the end node 110.

As indicated, the geolocation signal may comprise a signal that is readily identified and received by the plurality of gateways 102. For example, the geolocation signal parameter(s) may indicate that the geolocation signal comprises a narrowband signal (e.g., with a bandwidth of about 125 KHz or about 500 KHz) with a relatively high power compared to other communications typically effectuated by the end node 110. In an aspect, the geolocation signal may be implemented using a frequency-shift keying (FSK) modulation scheme. As another example, the geolocation signal parameter(s) may indicate that the geolocation signal be transmitted by the end node 110 at a specified time, such as for the purpose of avoiding a periodic interference in the environment. Further, the geolocation signal parameter(s) may indicate that the geolocation signal comprise a particular waveform. For example, the waveform of the geolocation signal may comprise several maxima and/or minima to avoid a fluctuating noise profile in the environment. As another example, the geolocation signal parameter(s) may specify that the geolocation signal be transmitted on a certain channel or a certain set of channels.

The geolocation signal may be embodied as an uplink message packet. As such, the uplink message packet may include a payload comprising data and a preamble with metadata describing the payload and/or the uplink message packet itself. Further, the geolocation signal may include a time stamp indicating the time that the end node 110 transmits the geolocation signal (which may be referred to as the "transmission time"). The time stamp may be determined according to a common clock synchronized between the end node 110 and the gateways 102.

In some aspects, the end node 110 may transmit a pre-notification to the gateways 102 before transmitting the geolocation signal in order to notify those gateways 102 that the geolocation signal will be sent. The pre-notification may include a time at which the end node 110 plans to transmit the geolocation signal. The pre-notification may additionally include a channel or set of channels on which the geolocation signal will be transmitted by the end node 110. The pre-notification may be in the form of a low power spread spectrum signal, as is used in standard non-geolocation communications between the end node 110 and the gateways 102. Further, instructions for the end node 110 to send the pre-notification to the gateways 102 may have been included in the downlink message packet with the geolocation signal parameter(s) previously sent from the radio controller 106 to the end node 110. The gateways 102 may receive the pre-notification from the end node 110 and adjust their operation accordingly to identify and receive the geolocation signal from the end node 110. For example, the gateways 102 may tune their respective transceiver antennas to one or more channels specified in the pre-notification. Further, the gateways 102 may tune their respective transceiver antennas to the one or more channels at a time specified in the pre-notification.

At step 210, the respective times at which the geolocation signal is received by each of the plurality of gateways 102 may be identified and recorded. The respective time of receipt (which may be referred to as the "receipt time") may be identified by each of the plurality of gateways 102. A time stamp of the receipt time may be appended to the uplink message packet received by the respective gateway 101 or the time stamp may be stored and communicated separately.

The time stamp may be determined according to a common clock maintained across the end nodes 110 and the gateways 102, for example.

The gateways 102 may transmit the respective receipts times to the radio controller 106, which, in turn, may transmit the receipt times to the geolocation resolver 112. Likewise, the transmission time (i.e., the time at which the end node 110 sent the geolocation signal) may additionally be sent to the radio controller 106 and the geolocation resolver 112. In some aspects, the transmission time and the receipt times may be included in the uplink message packet. Thus, the uplink message packet may be transmitted by the gateways 102 to the radio controller 106. The transmission time and the receipt times may be extracted from uplink message packet by the radio controller 106 and sent on to the geolocation resolver 112. In other aspects, particularly in cases where trilateration is used in the geolocation process instead of multilateration, the differences in the transmission time and the receipt times may be calculated to determine the respective times of flight of each transmission between the end node 110 and the respective gateway 102. The times of flight may accordingly be transmitted to the radio controller 106 and/or the geolocation resolver 112 for use in determining the geolocation of the end node 110. The times of flight may be determined by the gateways 102, the radio controller 106, and/or the geolocation resolver 112.

At step 212, based at least on the receipt times, the geolocation of the end node 110 may be determined. The determination of the geolocation of the end node 110 may further be based on the known information relating to the system 100 and components thereof, such as the location of the gateways 102. For example, the receipt times and locations of the gateways 102 may be used in a multilateration process to determine the geolocation of the end node. As another example, the receipt times, as well as the transmission time and the known locations of the gateways 102, may be used in a trilateration process to determine the geolocation of the end node 110. The geolocation of the end node 110 may be determined by the geolocation resolver 112.

Figure 3:
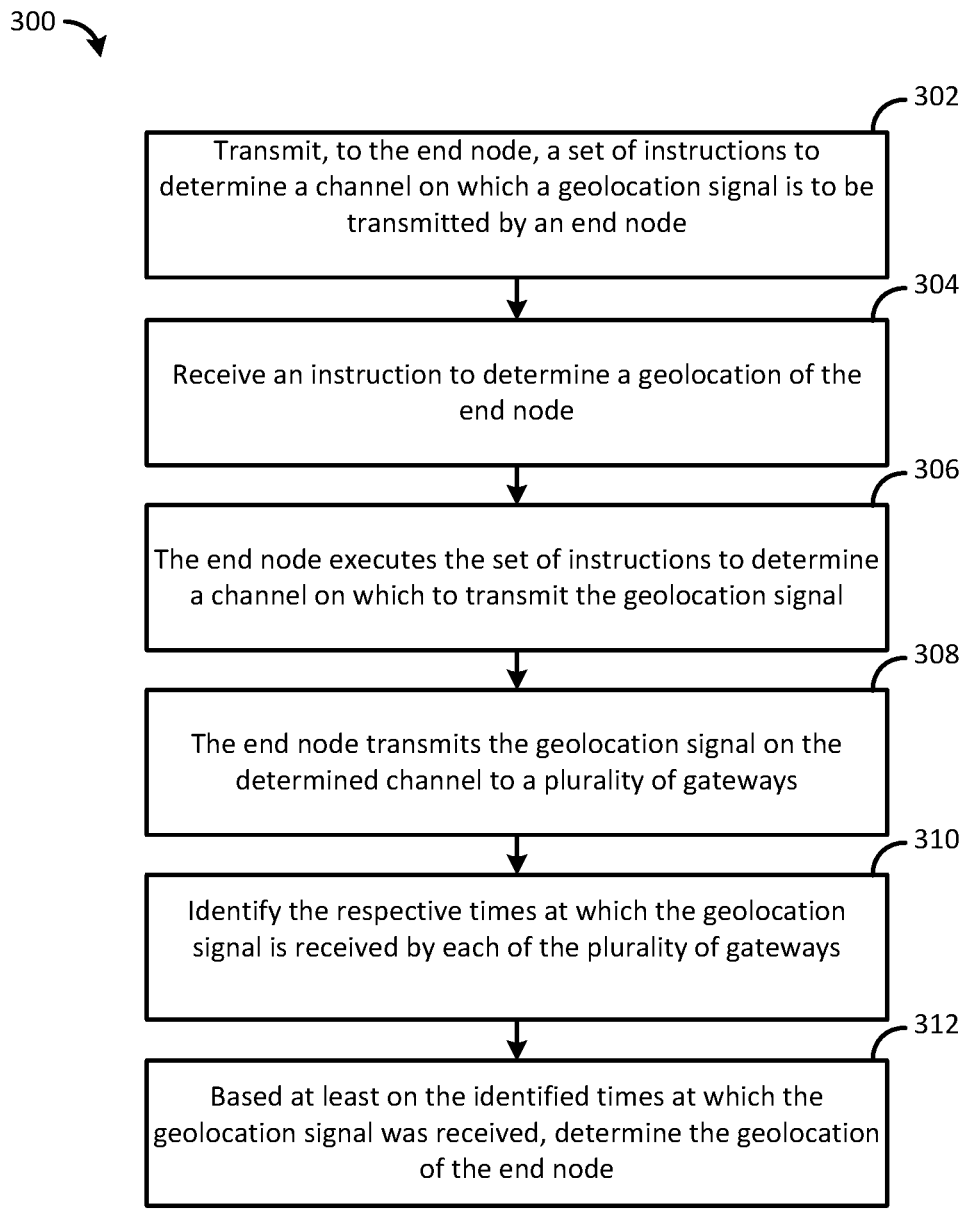
FIG. 3 illustrates a flow chart of an example method according to an embodiment of the present disclosure.

FIG. 3 illustrates an example method 300 of determining a precise geolocation of one of the end nodes 110. At step 302, a set of instructions is transmitted to the end node 110. The set of instructions may include an algorithm to determine one or more channels on which a geolocation signal is to be transmitted by the end node 110 to a plurality of gateways 102. Further, a geolocation channel map may be transmitted to the end node 110, either with the set of instructions or separately. The geolocation channel map may define one or more channels and their corresponding frequencies at which the end node 110 may potentially transmit the geolocation signal to the gateways 102, such as for purposes of determining the geolocation of the end node 110. The end node 110 may additionally receive, store, and/or use a standard channel map which defines one or more channels and their corresponding frequencies at which the end node 110 communicates data other than a geolocation signal, such as the typical transmission of data collected by the end node 110 and intended to be passed upstream to the application servers 108. It is noted that the channels defined by the geolocation channel map and the standard channel map are not necessarily mutually exclusive and the geolocation channel map may define one or more channels that are also defined in the standard channel map.

In an aspect, the set of instructions may include a pseudorandom algorithm that yields a predictable output of a channel upon a certain input. An example input of the algorithm may include the standard channel map, the geolocation channel map, an identifier of the end node 110 (e.g., a MAC address), and the time of the system 100 (e.g., the time according to a common clock synchronized across the system 100). The output channel may be a channel from the geolocation channel map.

In another aspect, the set of instructions may be associated with one of the gateway-channel clusters 120a, b (FIG. 1B). The set of instructions transmitted to and received by the end node 110 may be or correspond with the set of instructions that are also utilized by the gateways 102 of the gateway-channel cluster 120a, b to determine a channel from a pre-determined set of channels on which each of the gateways 102 operate during a time interval.

At step 304, an instruction or other indication to determine the geolocation of the end node 110 may be received. For example, the radio controller 106 may receive the instruction to determine the geolocation of the end node 110 from one or more of the applications servers 108. The application server 108 may provide such an instruction upon a determination that a precise geolocation of the end node 110 is needed or desirable based on, for example, an application of a business rule or a user input.

Based, at least in part, on the instruction or other indication to determine the geolocation of the end node 110, the radio controller 106 may transmit instructions to the end node 110 for the end node 110 to transmit the geolocation signal. In an aspect, the instructions may indicate a time at which the end node 110 is to transmit the geolocation signal. To this end, the radio controller 106 may transmit the instructions to one or more gateways 102. For example, the radio controller 106 may select one or more of the gateways 102 based on an expected or estimated proximity to the end node 110 and transmit the instructions to that gateway(s) 102. As another example, the radio controller 106 may select one or more of the gateways 102 based on one or more gateway-channel clusters 120a,b that may be associated with the end node 110. For instance, it may be known which gateway-channel cluster 120a, b most recently communicated with the end node 110. The gateway 102 may store the instructions until the gateway's 102 next communication with the end node 110. Upon such next communication, the gateway 102 may transmit the instructions to the end node 110. For example, the end node 110 may initiate a communication with the gateway 102 to transmit an uplink message packet to the gateway 102. The gateway 102 may respond to the received uplink message packet by transmitting a downlink message packet with an acknowledgement back to the end node 110. The downlink message packet may include the instructions for the end node 110 to transmit the geolocation signal to the gateways 102.

At step 306, responsive to receiving the instructions to transmit the geolocation signal, the end node 110 may execute the set of instructions to determine the channel on which to transmit the geolocation signal. As indicated, with one example algorithm included in the set of instructions, the end node 110 may input the standard channel map, the geolocation channel map, an identifier of the end node 110 (e.g., a MAC address), and the time of the system 100 into the algorithm and receive a channel as the output. The output channel may be a channel from the geolocation channel map.

In an aspect in which the set of instructions is associated with one of the gateway-channel clusters 120a, b and corresponds to the set of instructions or algorithm used by the gateways 102 of that gateway-channel cluster 120a, b to determine the channel upon which the gateways operate during a time interval, the end node 110 may execute such a set of instructions. The end node 110 may thereby determine the channel to which the gateways 102 are tuned during the present or future time interval. The end node 110 may previously have been informed of a particular gateway-channel cluster 120a, b. For example, a gateway-channel cluster identifier may have been included in a prior downlink message packet or other communication from one of the gateways 102 of the particular gateway-channel cluster 120a, b.

In an aspect, instead of the end node 110 executing the set of instructions, the radio controller 106 and/or one or more of the gateways 102 may execute the set of instructions to determine the channel on which the end node 110 is to transmit the geolocation signal to the gateway 102. The determined channel may then be transmitted to the end node 110 and/or the gateways 102 according to processes described elsewhere herein.

At step 308, the end node 110 may transmit the geolocation signal on the determined channel to a plurality of gateways 102. The geolocation signal may be transmitted by the end node 110 at a time specified in the instructions provided to the end node 110 or at the next time at which the end node 110 would otherwise communicate with the gateways 102. In some aspects, the geolocation signal may be transmitted responsive to the end node 110 receiving the instructions to do so and/or executing the set of instructions to determine the channel on which to transmit. The gateways 102 may accordingly receive the geolocation signal from the end node 110 on the channel.

The geolocation signal may comprise a high power signal. For example the geolocation signal may be transmitted with a power of about 1 Watt or other power level described herein as a high power signal. In an aspect, the geolocation signal may comprise an uplink message packet, as described elsewhere herein. Further, the geolocation signal may include a time stamp indicating the time that the end node 110 transmits the geolocation signal (the "transmission time"). The time stamp may be determined according to a common clock synchronized between the end node 110 and the gateways 102.

To receive the geolocation signal from the end node 110, each of the gateways 102 may be configured to tune to the channel on which the end node 110 transmits the geolocation signal. The gateways 102 may each tune to the channel at a specified time. The gateways 102 may be informed of the channel and/or the time according to one or more techniques.

In an aspect in which the end node 110 executes a set of instructions associated with one of the gateway-channel clusters 120a, b and corresponding to the set of instructions or algorithm used by the gateways 102 of that gateway-channel cluster 120a, b to determine the channel upon which the gateways operate during a time interval, as discussed above, the end node 110 may transmit the geolocation signal on the determined channel. Since the gateways 102 of the particular gateway-channel cluster 120a, b utilize a same or similar set of instructions or algorithms, those gateways 102 of the gateway-channel cluster 120a, b may be tuned to that same channel and may thereby receive the geolocation signal on the channel.

In one aspect, such as when the radio controller 106 (instead of the end node 110) executes the set of instructions to determine the channel and then communicates the channel to the end node 110, the radio controller 106 may transmit the channel and/or the time to the gateways 102. As it would typically be unnecessary to transmit the channel and/or time to all the gateways 102 in the system 100, it may be desirable to determine those gateways 102 that are expected to receive the geolocation signal from the end node 110. To this end, the radio controller 106 may use the known locations of the gateways 102 and an estimated or previously determined location of the end node 110 to determine those gateways that are within a threshold range of the end node 110. For example, the threshold range may correspond to the communication range of the radio transceiver of the end node 110.

As another method to determine those gateways 102 that are expected to receive the geolocation signal from the end node 110, the known locations of the gateways 102 may be represented in a grid layout of the environment, with each gateway 102 being located in a cell of the grid. Each cell may be associated with a multicast address that may be used to send a multicast communication to those gateways 102 located within the cell. The radio controller 106 may determine the gateways 102 that are expected to receive the geolocation signal from the end node 110 by identifying the cell corresponding to an estimated or previously known location of the end node 110. In one aspect, the gateways 102 within that cell may comprise the determined gateways 102. In another aspect, the gateways 102 within that cell as well as the gateways 102 in the cells adjacent to that cell may comprise the determined gateways 102. The radio controller 106 may accordingly transmit the channel and/or time to the gateways 102 using the multicast address(es) associated with those cell(s). In some aspects, the radio controller 106 may instead transmit the channel and/or time to the gateways 102 using unicast addresses (e.g., MAC addresses) of the gateways 102 located in the cell(s).

In another aspect, the gateways 102 may be informed of the channel on which the end node 110 will transmit the geolocation signal and/or the time thereof by the end node 110 transmitting a pre-notification to the gateways 102 before the end node 110 transmits the geolocation signal. The pre-notification may include an indication of the channel on which the end node 110 will transmit the geolocation signal. For example, the end node 110 may have previously executed the set of instructions to determine the channel. The pre-notification may further include the time at which the end node 110 will transmit the geolocation signal. The pre-notification may be in the form of a spread spectrum signal transmitted at a low power (e.g., about 0.1 Watt or other power level described herein as a low power signal) and on a channel from the standard channel map, such as the case with the standard communications between the end nodes 110 and the gateways 102.

At step 310, the respective times at which the geolocation signal is received by each of the plurality of gateways 102 may be identified and recorded. The respective time of receipt (the "receipt time") may be identified by each of the plurality of gateways 102. The receipt time may be determined according to a common clock maintained across the end nodes 110 and the gateways 102, for example.

The gateways 102 may each transmit the respective receipt times to the radio controller 106. In aspects in which the transmission time of the end node 110 is also included in the geolocation signal, the transmission time may additionally be transmitted to the radio controller 106. In turn, the radio controller 106 may transmit the receipt times (and transmission time, if applicable) to the geolocation resolver 112.

At step 312, the geolocation of the end node 110 may be determined based, at least in part, on the identified times at which the geolocation signal was received by the gateways 102. The determination of the geolocation of the end node 110 may further be based on the known information relating to the system 100 and components thereof, such as the location of the gateways 102. For example, the receipt times and locations of the gateways 102 may be used in a multilateration process to determine the geolocation of the end node. As another example, the receipt times, as well as the transmission time and the known locations of the gateways 102, may be used in a trilateration process to determine the geolocation of the end node 110. The geolocation of the end node 110 may be determined by the geolocation resolver 112.

It will be appreciated that the methods and techniques disclosed herein for determining a geolocation of an end node 110 in a low power wide area network may be equally applicable when applied to determining a geolocation of a gateway 102 in the low power wide area network. In this instance, the gateway 102 may perform some or all of the functionality described in relation to the end nodes 110 relevant to the determination of the geolocation of the end nodes 110. For example, one of the gateways 102 may transmit a geolocation signal to other gateways 102 with one or more parameters (e.g., as a high power signal) that facilitate the accurate receipt of the geolocation signal by the other gateways 102. Based at least in part on the respective reception times of the geolocation signal by the other gateways 102, the geolocation of the gateway 102 may thereby be calculated.

Figure 4:
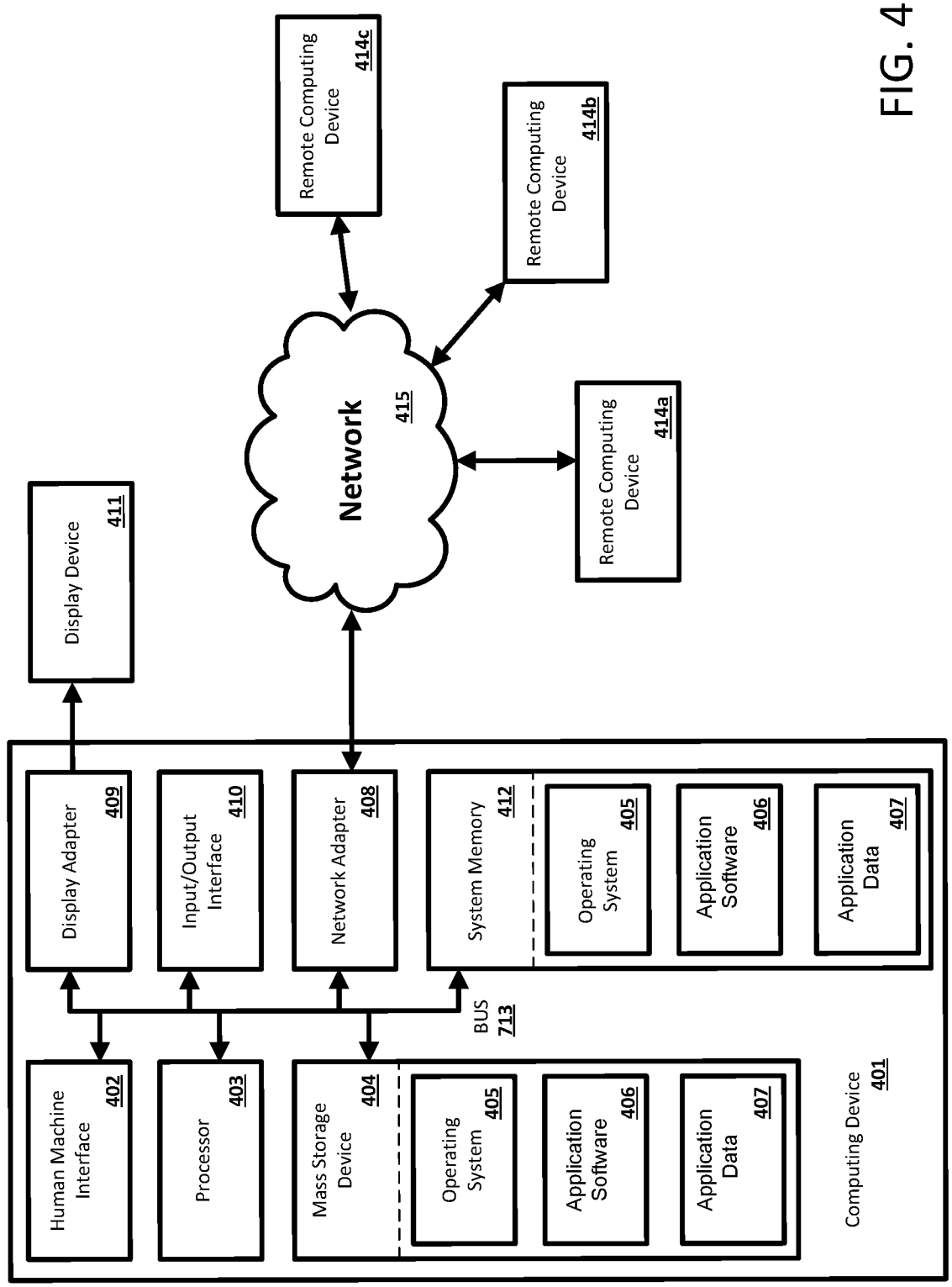
FIG. 4 illustrates a block diagram of an example computing device according to an embodiment of the present disclosure.

In an exemplary aspect, the methods and systems may be implemented on a computing device such as a computing device 401 (e.g., computer) as illustrated in FIG. 4 and described below. By way of example, the gateways 102, the radio controller 106, the application servers 108, the end nodes 110, and/or the geolocation resolver 112 of FIGS. 1A and 1B may be a computing device as illustrated in FIG. 4. Similarly, the methods and systems disclosed may utilize one or more computing device to perform one or more functions in one or more locations. FIG. 4 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems may be operational with numerous other general purpose or special purpose computing system environments or configurations. Examples of well known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods disclosed herein may be implemented via a general-purpose computing device in the form of a computing device 401. The components of the computing device 401 may comprise, but are not limited to, one or more processors 403, a system memory 412, and a system bus 413 that couples various system components including the processor 403 to the system memory 412. In the case of multiple processors 403, the system may utilize parallel computing.

The system bus 413 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 413, and all buses specified in this description may also be implemented over a wired or wireless network connection and each of the subsystems, including the processor 403, a mass storage device 404, an operating system 405, a service software 406, a service data 407, a network adapter 408, system memory 412, an Input/Output Interface 410, a display adapter 409, a display device 411, and a human machine interface 402, may be contained within one or more remote computing devices 414a,b,c at physically separate locations, connected through buses of this form, in effect implementing a fully distributed system.

The computing device 401 typically comprises a variety of computer readable media. Exemplary readable media may be any available media that is accessible by the computing device 401 and comprises, for example and not meant to be limiting, both volatile and non-volatile media, removable and non-removable media. The system memory 412 comprises computer readable media in the form of volatile memory, such as random access memory (RAM), and/or non-volatile memory, such as read only memory (ROM). The system memory 412 typically contains data such as service data 407 and/or program modules such as operating system 405 and service software 406 that are immediately accessible to and/or are presently operated on by the processor 403.

In another aspect, the computing device 401 may also comprise other removable/non-removable, volatile/non-volatile computer storage media. By way of example, FIG. 4 illustrates a mass storage device 404 which may provide non-volatile storage of computer code, computer readable instructions, data structures, program modules, and other data for the computing device 401. For example and not meant to be limiting, a mass storage device 404 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Additionally or alternatively, any number of program modules may be stored on the mass storage device 404, including by way of example, an operating system 405 and service software 406. Each of the operating system 405 and service software 406 (or some combination thereof) may comprise elements of the programming and the service software 406. Service data 407 may also be stored on the mass storage device 404. Service data 407 may be stored in any of one or more databases known in the art. Examples of such databases comprise, DB2®, Microsoft® Access, Microsoft® SQL Server, Oracle®, my SQL, PostgreSQL, and the like. The databases may be centralized or distributed across multiple systems.

In another aspect, the user may enter commands and information into the computing device 401 via an input device (not shown). Examples of such input devices comprise, but are not limited to, a keyboard, pointing device (e.g., a "mouse"), a microphone, a joystick, tactile input devices such as gloves, and other body coverings, and the like These and other input devices may be connected to the processor 403 via a human machine interface 402 that is coupled to the system bus 413, but may be connected by other interface and bus structures, such as a parallel port, game port, an IEEE 1394 Port (also known as a Firewire port), a serial port, or a universal serial bus (USB).

In yet another aspect, a display device 411 may also be connected to the system bus 413 via an interface, such as a display adapter 409. It is contemplated that the computing device 401 may have more than one display adapter 409 and the computing device 401 may have more than one display device 411. For example, a display device may be a monitor, an LCD (Liquid Crystal Display), or a projector. In addition to the display device 411, other output peripheral devices may comprise components such as speakers (not shown) and a printer (not shown) which may be connected to the computing device 401 via Input/Output Interface 410. Any step and/or result of the methods may be output in any form to an output device. Such output may be any form of visual representation, including, but not limited to, textual, graphical, animation, audio, tactile, and the like. The display 411 and computing device 401 may be part of one device, or separate devices.

The computing device 401 may operate in a networked environment using logical connections to one or more remote computing devices 414*a,b,c*. By way of example, a remote computing device may be a personal computer, portable computer, smartphone, a server, a router, a network computer, a peer device or other common network node, and so on. Logical connections between the computing device 401 and a remote computing device 414*a,b,c* may be made via a network 415, such as a local area network (LAN) and a general wide area network (WAN). Such network connections may be through a network adapter 408. A network adapter 408 may be implemented in both wired and wireless environments. Such networking environments are conventional and commonplace in dwellings, offices, enterprise-wide computer networks, intranets, and the Internet.

For purposes of illustration, application programs and other executable program components such as the operating system 405 are illustrated herein as discrete blocks, although it is recognized that such programs and components reside at various times in different storage components of the computing device 401, and are executed by the data processor(s) of the computer. An implementation of service software 406 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed:

1. A method comprising:
    causing an end node in a low power wide area network to transmit a high-power signal at a power between about 0.5 Watts and about 1 Watt;
    identifying a plurality of receipt times, each receipt time of the plurality of receipt times indicative of a time at which the high-power signal was received by a respective gateway of a plurality of gateways of the low power wide area network; and
    based at least in part on the plurality of receipt times, determining a geolocation of the end node.

2. The method of claim 1, wherein the high-power signal comprises a transmission time at which the end node transmitted the high-power signal, and the determining the geolocation of the end node is further based on the transmission time.

3. The method of claim 1, wherein the end node is configured to send, via the low power wide area network, data communications using low-power signals at a power of about 0.1 Watt or less.

4. The method of claim 1, wherein the causing the end node to transmit the high-power signal comprises causing the end node to transmit a pre-notification communication indicating a time at which the end node will transmit the high-power signal.

5. The method of claim 4, wherein the pre-notification communication further comprises a channel on which the high-power signal will be transmitted by the end node.

6. A method comprising:
    causing transmission, to an end node of a low power wide area network, of one or more parameters of a signal to be transmitted by the end node;
    receiving, from each gateway of a plurality of gateways of the low power wide area network, data indicative of a time at which a respective gateway of the plurality of gateways received the signal transmitted, according to the one or more parameters, from the end node; and
    based at least in part on the data indicative of the times at which the respective gateways each received the signal from the end node, determining a geolocation of the end node.

7. The method of claim 6, wherein the one or more parameters comprise a power at which the signal is to be transmitted.

8. The method of claim 7, wherein the power is based on at least one of:
    an estimated distance between the end node and at least one of the plurality of gateways, and
    a presence, or lack thereof, of an obstruction between the end node and the at least one of the plurality of gateways.

9. The method of claim 6, wherein the one or more parameters comprise a first channel on which the end node is to transmit the signal, and wherein the first channel is based on interference on a different second channel.

10. The method of claim 6, wherein the one or more parameters comprise a time at which the end node is to transmit the signal, and wherein the time is based on a periodic interference in an environment in which the end node and plurality of gateways operate.

11. The method of claim 6, wherein the one or more parameters comprise an attribute of a waveform of the signal.

12. The method of claim 11, wherein the attribute of the waveform of the signal comprises two or more maxima and minima.

13. A method comprising:
    causing transmission, to an end node of a low power wide area network, of a set of instructions to determine a channel on which a signal is to be transmitted by the end node;
    causing the end node to transmit the signal on a channel determined by execution of the set of instructions by the end node;
    identifying a plurality of receipt times, each receipt time of the plurality of receipt times indicative of a time at which the signal was received, on the channel, by a respective gateway of a plurality of gateways of the low power wide area network; and
    based at least in part on the plurality of receipt times, determining a geolocation of the end node.

14. The method of claim 13, wherein the plurality of gateways comprise a gateway-channel cluster in which each gateway operates on the same channel at a given time, and wherein the channel on which each gateway in the gateway-channel cluster operates corresponds to the channel on which the signal will be transmitted by the end node.

15. The method of claim 13, further comprising:
    causing transmission, to the end node, of an instruction for the end node to transmit the signal at a pre-determined time, wherein the signal is transmitted by the end node at the pre-determined time.

16. The method of claim 13, wherein the signal is transmitted by the end node at a power of between about 0.5 Watts and about 1 Watt.

17. The method of claim 14, further comprising:
    causing transmission, to at least one gateway of the plurality of gateways, an instruction to tune a transceiver of the at least one gateway to the channel, wherein the signal is received by the at least one gateway via the respective transceiver tuned to the channel.

18. The method of claim 17, wherein the instruction to tune the transceiver of the at least one gateway to the channel further comprises a time to tune the transceiver of the at least one gateway to the channel, and wherein the transceiver of the at least one gateway is tuned to the channel at the time.

19. The method of claim 13, further comprising:
    causing the end node to transmit a pre-notification communication indicating a time at which the end node will transmit the signal.

20. The method of claim 19, wherein the pre-notification communication further comprises the channel.

* * * * *